United States Patent [19]
Yellin

[11] 3,987,584
[45] Oct. 26, 1976

[54] PLANTERS UNIT WITH MEANS FOR FERTILIZING THE SOIL

[76] Inventor: Bernard Yellin, 5252 S. Kolmar Ave., Chicago, Ill. 60521

[22] Filed: Nov. 10, 1975

[21] Appl. No.: 630,146

[52] U.S. Cl. .............................................. 47/34 R
[51] Int. Cl.² .......................................... A01G 9/02
[58] Field of Search ................... 47/34, 38–38.1, 47/48.5

[56] References Cited
UNITED STATES PATENTS

| | | | |
|---|---|---|---|
| 1,988,307 | 1/1935 | Fay | 47/48.5 X |
| 1,996,898 | 4/1935 | Brandell | 47/38 |
| 2,026,679 | 1/1936 | Higgins | 47/34 |
| 2,222,815 | 11/1940 | Johnson | 47/34 |
| 2,228,575 | 1/1941 | Luipersbek | 47/34 |
| 2,234,992 | 3/1941 | Tracey | 47/38.1 |
| 2,550,602 | 4/1951 | Rothe | 47/34 |
| 2,834,153 | 5/1958 | Fearn | 47/34 |

FOREIGN PATENTS OR APPLICATIONS

| | | | |
|---|---|---|---|
| 6,192 | 6/1906 | Australia | 47/34 |
| 17,945 | 1910 | United Kingdom | 47/34 |

Primary Examiner—Robert E. Bagwill
Attorney, Agent, or Firm—Max R. Kraus

[57] ABSTRACT

A planters unit which includes a container or pot for the soil, with said container having a fertilizer chamber extending into the interior of the container, which container and fertilizer chamber are integrally molded of a plastic material. The fertilizer chamber has openings which communicate with the interior of the container. The fertilizer chamber is open at the bottom to receive replaceable fertilizing means. The fertilizer chamber is closed by a removable closure cap. The liquid poured on the soil enters the fertilizer chamber and contacts the fertilizing means and then passes outwardly of the fertilizer chamber to fertilize the soil.

9 Claims, 5 Drawing Figures

U.S. Patent  Oct. 26, 1976  3,987,584 ed States Patent No. 3,987,584

PLANTERS UNIT WITH MEANS FOR FERTILIZING THE SOIL

BRIEF SUMMARY OF THE INVENTION

One of the objects of this invention is to provide a planters unit which includes a container or pot for the soil and which has a fertilizer chamber containing fertilizing means whereby the liquid put into the soil will enter the fertilizer chamber and will mix with the fertilizing means and then the admixed liquid will pass outwardly of the fertilizer chamber to fertilize the soil.

Another object of this invention is to integrally form by injection plastic molding, a planters unit comprising a container or pot with an integrally formed fertilizer chamber with openings in the fertilizer chamber to permit the passage of the liquid into and out of the fertilizer chamber.

Another object is to provide a planters unit which is molded of plastic material and may be economically produced.

DESCRIPTION OF THE PREFERRED EMBODIMENTS

Figure 1:
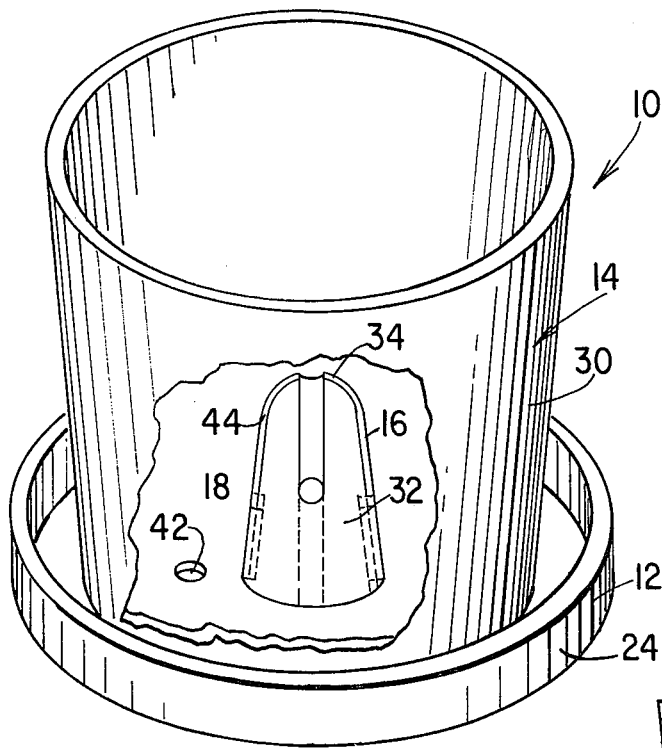
FIG. 1 is a view with the container or pot broken away showing this invention.

The planters unit of this invention is generally indicated at 10 and includes an annular base pan or tray, generally indicated at 12, a container or pot for planting flowers or plants, generally indicated at 14 which is removably positioned on the base pan 12. The container or pot 14 has a fertilizer chamber, generally indicated at 16, which is molded as an integral part of the container or pot 14. The fertilizer chamber 16 is formed with a plurality of spaced openings 18 therein. The fertilizer means generally indicated at 20 comprises a tapered solid stick composed of desired chemicals and ingredients which will act to fertilize the soil in the container or pot, as will be subsequently described.

More specifically, the base pan or tray 12 is integrally injection molded of a plastic material and comprises an annular bottom 22 bounded by an annular upstanding rim 24. An annular centering ring 26 is formed in the base for centering the container or pot 14.

The container or pot 14 is integrally injection molded of a plastic material and comprises an annular bottom wall 28 with an upstanding inclined annular side wall 30 which inclines outwardly and upwardly from the bottom. Formed centrally as an integral part of the bottom wall 28 and extending upwardly into the container or pot 14 is the fertilizer chamber 16 which has an upstanding annular inwardly inclined side wall 32 which is closed at the top by a dome-shaped portion 34 formed integrally with the side wall 32. Depending below the bottom wall 28 and formed as a continuation of the upwardly extending side wall 32 is an annular wall 36 leaving the bottom of the fertilizer chamber 16 open as at 37 when same is molded as an integral part of the container or pot 14. A separately formed closure cap 38 is positioned to frictionally engage the depending annular wall 36 to close the bottom opening 37 of the fertilizer chamber.

Depending from the bottom wall 28 of the container or pot 14 is a depending rim 40, the bottom of which rests on the bottom of the base or tray 12 and spaces the bottom wall 28 of the container or pot therefrom. When the container or pot 14 is positioned on the base or tray 12, the depending rim 40 will be positioned within the annular ring 26 on the base or tray 12 which will serve to centrally position the pot or container with respect to the base or tray. The bottom wall of the container or flower pot has a plurality of spaced openings 42 for drainage of the excess liquid from the soil in the container into the base or tray 12. It will be seen that the upstanding wall 32 of the fertilizing chamber 16 has a slight incline which inclines inwardly from the bottom towards the top.

Figure 2:
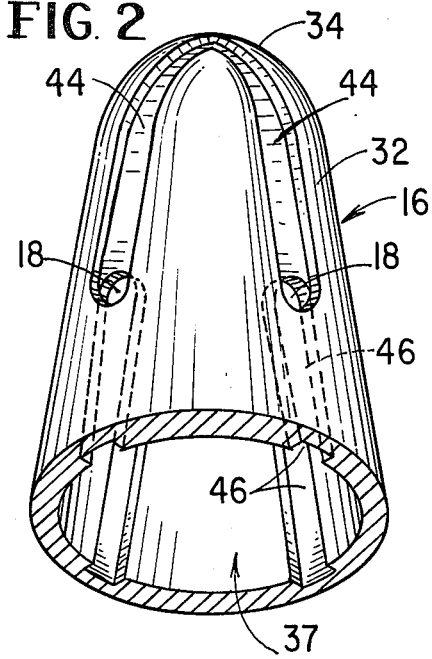
FIG. 2 is a view showing the fertilizer chamber which is molded integrally with the container or pot.
Figure 4:
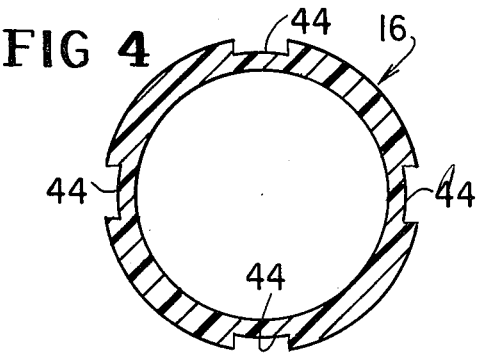
FIG. 4 is a sectional view taken on lines 4—4 of FIG. 3.
Figure 3:
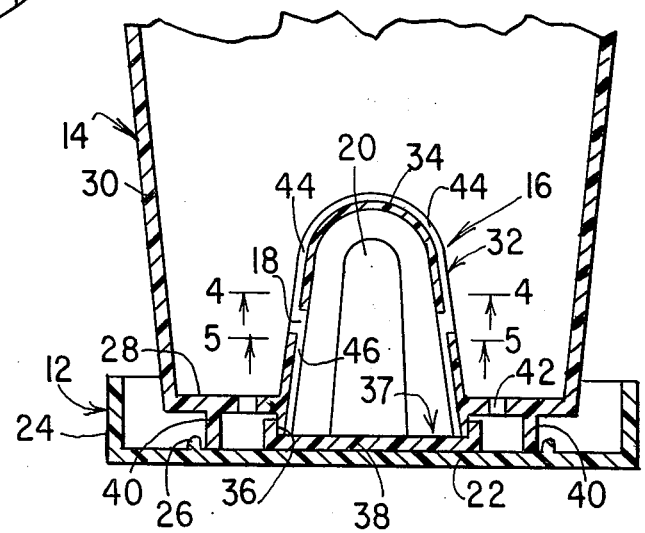
FIG. 3 is a central sectional view of FIG. 1.
Figure 5:
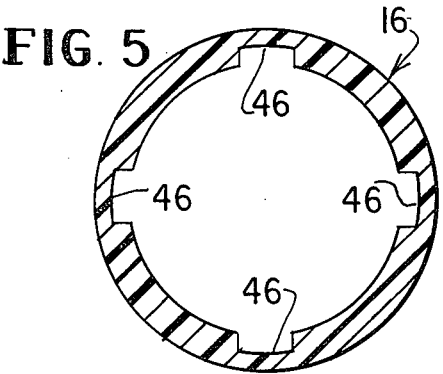
FIG. 5 is a sectional view taken on lines 5—5 of FIG. 3.

In order to injection mold the fertilizer chamber 16 as an integral part of the container or pot 14 and provide the spaced openings 18 in the wall thereof, the upper portion of the side wall 32, dome 34, is molded with exteriorly facing channels or grooves indicated by the numeral 44 and the lower portion of the wall 32 is molded with interiorly facing channels or grooves indicated by the numeral 46. The spaced laterally facing openings 18 being formed in the wall 32 between the exteriorly and interiorly facing grooves are best seen in FIGS. 2 and 3, namely where the exteriorly and interiorly facing grooves meet approximately centrally of the height of the fertilizer chamber 16.

All of the foregoing units other than the fertilizer means are formed of a plastic material. The base or tray 12 being one component, the cup-shaped closure member 38 being another and the pot or container 14 with the fertilizer chamber 16 as an integral part thereof being the third component.

The fertilizer stick 20 is positioned on the closure cap 38 and the closure cap 38 is positioned to close the bottom opening 37 of the fertilizer chamber 16. The closure cap 38 has a frictional fit with the depending wall 36. The container or pot 14 is positioned as best shown in FIG. 3 with the depending rim 40 positioned within the centering ring 26. The bottom wall 28 of the pot or container 14 is spaced from the bottom of the base or tray 12.

The container or pot 14 is filled with soil and the plant or flower or seed is potted in the soil. The soil thus surrounds the exterior of the fertilizer chamber 16. As water is added to the soil, the water will seep or pass through the openings 18 and into the interior of the fertilizer chamber 16 and will mix with the fertilizer stick 20 and the water will thus be treated with fertilizer and pass out of the fertilizer chamber through the same openings 18 and back into the soil to fertilize same. Some of the excess water will drain through the openings 42 into the base pan or tray 12.

The pot or container 14 may be readily lifted from the base or tray 12 and the closure cap 38 is removed so that the fertilizer stick 20 may be replaced when necessary.

What is claimed is:

1. A planters unit having a container having a continuous side wall and a bottom wall for receiving soil and the like, and a pan below said container, said container having a drain opening in said bottom wall to said pan, a fertilizer chamber extending into the interior of said container and having at least one opening therein upwardly spaced from said drain opening and communicating with the interior of said container, said fertilizer chamber being otherwise imperforate and adapted to contain fertilizing means therein so that the liquid poured on the soil within the container enters the fertilizer chamber through said chamber opening and contacts the fertilizing means and then passes outwardly of the fertilizer chamber and into the soil in said container for fertilizing the soil.

2. A planters unit as set forth in claim 1 in which the container and fertilizer chamber are integrally formed of a plastic material with the bottom of said fertilizer chamber closed by a removable closure member.

3. A planters unit as set forth in claim 2 in which the top of the fertilizer chamber is closed.

4. A planters unit as set forth in claim 2 in which the container is separate from the pan and is positioned on said pan and with the bottom wall of the container spaced from the bottom of the pan.

5. A planters unit set forth in claim 4 in which the fertilizing means comprises a solid mass of fertilizing material which is supported on the removable closure member.

6. A planters unit as set forth in claim 5 in which the fertilizing means is in the form of a stick which extends into the fertilizer chamber and which is replaceable.

7. A planters unit as set forth in claim 4 in which the removable closure member is frictionally secured to the bottom of the fertilizer chamber.

8. A planters unit as set forth in claim 1 in which the container and the fertilizer chamber are integrally formed and molded of a plastic material and in which said fertilizer chamber has an upstanding side wall which inclines inwardly towards the top with the upper portion of said side wall having exteriorly facing grooves and with the lower portion of said side wall having interiorly facing grooves with a fertilizer chamber opening formed in said grooves where said exteriorly and interiorly facing grooves meet.

9. A planters unit as set forth in claim 8 in which the fertilizer chamber openings are approximately centrally of the height of the fertilizer chamber.

* * * * *